US009974320B2

(12) United States Patent
Mo et al.

(10) Patent No.: US 9,974,320 B2
(45) Date of Patent: May 22, 2018

(54) CHEWING GUM BASE CONTAINING SUBSTITUTED POLYSACCHARIDES AND CHEWING GUM PRODUCTS MADE THERE FROM

(71) Applicant: WM. WRIGLEY JR. COMPANY, Chicago, IL (US)

(72) Inventors: Xiaoqun Mo, Oak Park, IL (US); Jingping Liu, Indian Head Park, IL (US); Kaichang Li, Corvallis, OR (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 863 days.

(21) Appl. No.: 14/356,364

(22) PCT Filed: Oct. 26, 2012

(86) PCT No.: PCT/US2012/062043
§ 371 (c)(1),
(2) Date: May 5, 2014

(87) PCT Pub. No.: WO2013/070444
PCT Pub. Date: May 16, 2013

(65) Prior Publication Data
US 2014/0314905 A1    Oct. 23, 2014

Related U.S. Application Data

(60) Provisional application No. 61/556,546, filed on Nov. 7, 2011.

(51) Int. Cl.
| A23G 4/08 | (2006.01) |
| A23G 4/10 | (2006.01) |
| C08B 37/00 | (2006.01) |

(52) U.S. Cl.
CPC ............ *A23G 4/08* (2013.01); *A23G 4/10* (2013.01); *C08B 37/0087* (2013.01); *C08B 37/0093* (2013.01)

(58) Field of Classification Search
CPC ........ A23G 4/08; A23G 4/10; C08B 37/0087; C08B 37/0093
See application file for complete search history.

(56) References Cited

U.S. PATENT DOCUMENTS

| 2,273,425 A | 2/1942 | Traylor |
| 3,666,492 A | 5/1975 | Teng et al. |
| 3,883,666 A | 5/1975 | Teng et al. |
| 4,582,707 A | 4/1986 | Calabro |
| 6,773,730 B1 | 8/2004 | Liu et al. |
| 6,803,061 B1 | 10/2004 | Foster et al. |
| 2006/0240144 A1 | 12/2006 | Shalaby et al. |
| 2006/0280835 A1* | 12/2006 | Jani .......................... A23G 1/54 426/3 |
| 2011/0196071 A1 | 8/2011 | Mentink |
| 2011/0262586 A1 | 10/2011 | Liu |

FOREIGN PATENT DOCUMENTS

| CN | 1251267 A | 4/2000 | |
| WO | 0101788 A1 | 1/2001 | |
| WO | 0110239 A1 | 2/2001 | |
| WO | 2007143989 A1 | 12/2007 | |
| WO | WO 2010080612 A1 * | 7/2010 | ............... A23G 4/08 |
| WO | 2012052127 A1 | 4/2012 | |
| WO | 2012052128 A1 | 4/2012 | |

OTHER PUBLICATIONS

Chudzikowski, R.J. 1971. "Guar gum and its applications." J. Soc. Cosmet. Chem. vol. 22, pp. 43-60.*
Kamel, M, El-Thalouth, I.A., Abou Amer, M., Ragheb, A. Nassar, S.H. 1991. "Chemical Modification of Guaran Gum, Part I: Carboxymethylation in Aqueous Medium." Starch/Starke. vol. 44, pp. 433-437.*
Ragheb, A.A., Kamel, M., El-Thalouth, A. Nassar, S.H. 1995. "Utilization of carboxymethyl guaran derivatives in printing cotton fabrics with reactive dyes." Indian Journal of Fibre & Textile Research, vol. 20, pp. 97-101.*
Stephen, A.M., Churms, S.C. 2006. "Introduction." In Food Polysaccharides and Their Applications, 2nd Edition. pp. 1-24. CRC Press.*
Eliasson et al., "Cereals in Breadmaking: A Molecular Colloidal Approach," Chapter 2, Marcel Dekker, New York, 1993, p. 104.
Jane et al., "Effects of Amylopectin Branch Chain Length and Amylose Content on the Gelatinization and Pasting Properties of Starch," Cereal Chemistry, 76(5), 1999-09-01, pps. 629-637.
Born et al., "11 Xanthan," 2002, pp. 259-269.

* cited by examiner

Primary Examiner — Nikki H. Dees

(57) ABSTRACT

A chewing gum base comprises food acceptable substituted polysaccharides wherein substituents on the saccharide units in the polysaccharides produce a degree of substitution of at least I.0. The polysaccharides may have branches with an average length of 1 to 15 saccharide units per branch. The polysaccharides may be linked saccharide units such as allose, altrose, mannose, gulose, idose, galactose, 3,6 anhydro galactose, glucuronic acid, mannuronic acid, galacturonic acid, aldobiouronic acid, fucose, rhamnose, arabinose, xylose, talose, acyl substituted glucose, fructose, lactose and combinations thereof.

25 Claims, 2 Drawing Sheets

CHEWING GUM BASE CONTAINING SUBSTITUTED POLYSACCHARIDES AND CHEWING GUM PRODUCTS MADE THERE FROM

PRIORITY DATA

The present patent application is a 371 of International Application Ser. No. PCT/US12/62043 filed Oct. 26, 2012, which claims benefit from U.S. Provisional Ser. No. 61/556,546, filed Nov. 7, 2011, and incorporates the above applications by reference herein as if they are fully restated herein.

BACKGROUND OF THE INVENTION

The present invention relates to chewing gum. More specifically, this invention relates to improved formulations for chewing gum bases and chewing gums containing substituted polysaccharides.

The fundamental components of a chewing gum typically are a water-insoluble gum base portion and a water-soluble bulking agent portion. The primary component of the gum base is an elastomeric polymer which provides the characteristic chewy texture of the product. The gum base will typically include other ingredients which modify the chewing properties or aid in processing the product. These include plasticizers, softeners, fillers, emulsifiers, plastic resins, as well as colorants and antioxidants. The water soluble portion of the chewing gum typically includes a bulking agent together with minor amounts of secondary components such as flavors, high-intensity sweeteners, colorants, water-soluble softeners, gum emulsifiers, acidulants and sensates. Typically, the water-soluble portion, sensates, and flavors dissipate during chewing and the gum base is retained in the mouth throughout the chew, resulting in a gum cud.

One problem with traditional gum bases is the fact that conventional gum bases are predominantly made from polymers that are derived from non-renewable resources. While chicle and other naturally occurring polymers have been used in the past to make chewing gum, polymers from natural sources tend to have properties that fluctuate, most commonly with the season of the year. This makes it difficult to formulate quality chewing gum products on a consistent basis. Hence, chewing gum bases commonly made today use a number of man-made polymers derived from petroleum feed stocks. For example, butyl rubber is derived from petroleum chemicals. This has the advantage that the polymers are consistent over time, and properties desirable in the chewing gum can be taken into account when the polymers are made to achieve the desired chew characteristic for the chewing gum product. However, since petroleum is a diminishing resource, and subject to disruption in its supply, and food grade polymers derived there-from may be available from a limited number of sources, a butyl rubber alternative would alleviate dependence on petroleum chemicals, and create an innovative gum base using biobased material. It would be desirable to provide a chewing gum base that could be made from renewable resources but that also provided the chewing gum with a texture, mouth feel and other chew characteristics that are desirable.

SUMMARY OF THE INVENTION

Novel chewing gum bases have been invented comprising food acceptable polymers derived from polysaccharides, which are derived from renewable products. The substituted polysaccharides may be used as an elastomer alternative.

In one embodiment, a chewing gum base comprises food acceptable substituted, branched polysaccharides wherein substituents on the saccharide units in the polysaccharides produce a degree of substitution of at least 1.0; and the polysaccharides have branches with an average length of 1 to 15 saccharide units per branch.

In a second embodiment, a chewing gum base comprises food acceptable substituted polysaccharides wherein the polysaccharides consist essentially of linked saccharide units selected from the group consisting of allose, altrose, mannose, gulose, idose, galactose, 3,6 anhydro galactose, sulfated 3,6 anhydro galactose, glucuronic acid, 4-o-methyl-glucuronic acid, esters of galacturonic acid, mannuronic acid, galacturonic acid and esters, aldobiouronic acid, fucose, rhamnose, sulfated galactose, arabinose, xylose, talose, acyl substituted glucose, 2-acetamido-2-deoxyl-glucose, fructose, lactose and their derivatives and combinations thereof, and wherein substituents on the saccharide units in the polysaccharides produce a degree of substitution of at least 1.0.

In a third embodiment, a chewing gum base comprises food acceptable substituted polysaccharides wherein the polysaccharides are selected from the group consisting of alginate, carrageenan, furcellaran, cellulose, guar gum, agar, gum arabic, gum ghatti, gum karaya, gum tragacanth, locust bean gum, pectin, tamarind gum, xanthan gum, arabinoxylan, xyloglucan, tara gum, cereal β-glucan, konjac mannan, curdlan, gellan gum, pullulan, scleroglucan, alternan, elsinan, levan, dextran, chitin, chitosan and combinations thereof; and substituents on the saccharide units in the polysaccharides produce a degree of substitution of at least 1.0.

In yet another embodiment, a chewing gum base comprises food acceptable substituted polysaccharides wherein the polysaccharides consist of saccharide units linked together through glycosidic linkages and wherein the glycosidic linkages in the polysaccharides comprise predominantly glycosidic linkages selected from the group consisting of β-1,4 linkages, β-1,3 linkages, β-1,2 linkages, α-1,2 linkages, β-1,5 linkages, α-1,6 linkages, α-1,3 linkages, α-1,5 linkages, β-1,6 linkages and combinations thereof; and substituents on the saccharide units in the polysaccharides produce a degree of substitution of at least 1.0.

In another embodiment, a chewing gum composition comprises about 5% to about 95% chewing gum base comprising food acceptable substituted, branched polysaccharides wherein substituents on the saccharide units in the polysaccharides produce a degree of substitution of at least 1.0, and the polysaccharides have branches with an average length of 1 to 15 saccharide units per branch; at least one sweetener; and at least one flavoring agent.

Since polysaccharides typically come from renewable sources, the substituted polysaccharides described herein used as a gum base ingredient replaces man-made polymers derived from petroleum feed stocks. Additional features and advantages of the disclosed embodiments are described in, and will be apparent from, the following Detailed Description and the attached drawings.

DETAILED DESCRIPTION

Figure 1:
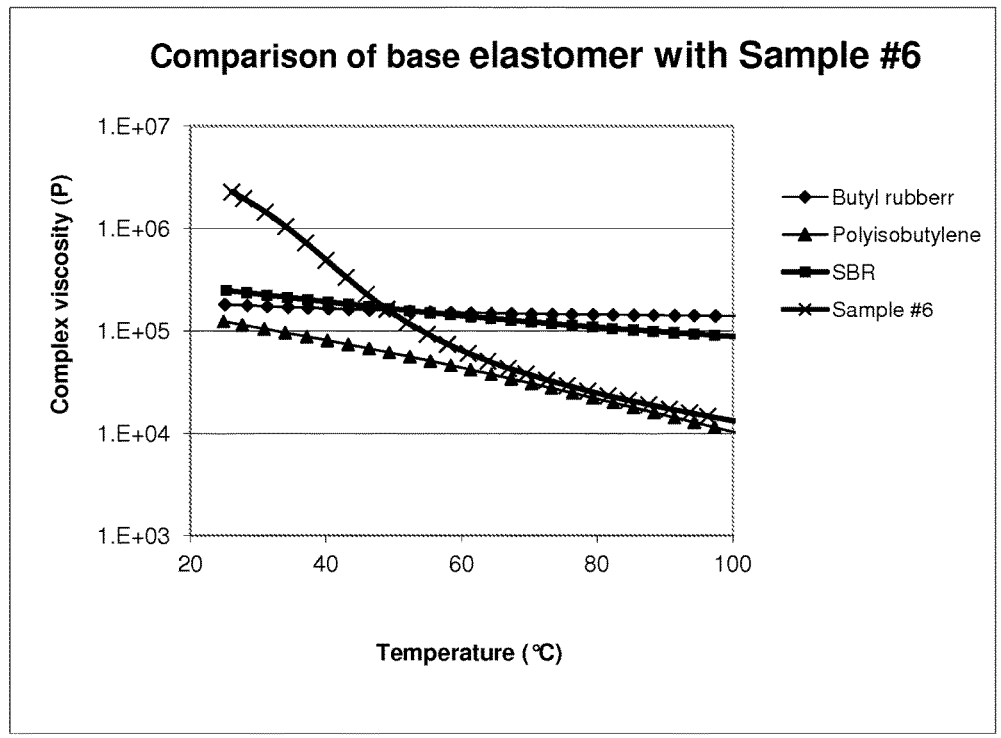
FIG. 1 is a graphical illustration comparing the complex viscosity as a function of temperature for a sample of substituted polysaccharide and three conventional chewing gum base elastomers.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Unless otherwise specified, all percentages herein are weight percentages. Several terms used in the specification and claims have a meaning defined as follows.

The term "predominantly" means over 50%.

The term "saccharide unit" means a single monosaccharide that is joined to one or more other monosaccharide units. Sometimes these saccharide units are referred to as "saccharide residues", as they are formed by removal of a hydrogen ion from a saccharide during formation of a polysaccharide. "Saccharide unit" as used herein is intended to include not only residues of simple sugars, but also the residues of their corresponding derivatives such as amide sugars and acids produced (for example) by oxidizing such sugars, and food acceptable salts of those acids.

The term "polysaccharide" refers to a macromolecule consisting of a large number of saccharide units joined to each other by glycosidic linkages. These structures are often linear, but may contain various degrees of branching. Polysaccharides are often quite heterogeneous, containing slight modifications of the repeating unit. Depending on the structure, these macromolecules can have distinct properties from their monosaccharide building blocks. They may be amorphous or even insoluble in water. When all the saccharide units in a polysaccharide are the same type the polysaccharide is called a homopolysaccharide or homoglycan, but when more than one type of saccharide unit is present they are called heteropolysaccharides or heteroglycans. Examples include storage polysaccharides such as starch and glycogen, and structural polysaccharides such as cellulose and chitin.

Polysaccharides have a general formula of $C_x(H_2O)_y$ where x is usually a large number between 200 and 3000. Considering that the repeating units in the polymer backbone are often six-carbon saccharide units, some of the polysaccharides have a formula that can be represented as $(C_6H_{10}O_5)_n$ where $40 \leq n \leq 15000$.

In some embodiments of the present invention, the polysaccharides are branched polysaccharides. By "branched polysaccharides" it is meant that the polymeric backbone contains linear or branched side chains attached to at least 2% of the saccharide units present in the polymeric backbone.

The term "linear polysaccharides" as used herein refers to polymers of saccharide units in which essentially all non-terminal saccharide units are linked to exactly two other saccharide units to form an unbranched chain. It will be recognized that a small number of such units, for example less than 0.5%, may in fact be linked to a third saccharide unit, thus forming a branch. For purposes of the present invention, such polysaccharides having this trivial degree of branching will be considered to be linear polysaccharides.

Many polysaccharides are produced by the growth of living organisms. The polysaccharides found in nature often are very consistent throughout the polymer, having a consistently repeating pattern if the polysaccharide is a heteropolysaccharide. Also, in nature the polysaccharides are typically consistent with one another in a given source, and are fairly consistent within in a given species.

Locust bean gum is a multifunctional macromolecular polysaccharide found in carob tree seeds. Ground endosperms are the source of locust bean gum.

The gum from the seeds consists of polysaccharides that are very similar to one another throughout the seed. Also, the structure of the polysaccharide molecules from carob tree seeds in one local will be similar to the structure of the polysaccharide molecules from carob tree seeds grown in another local. Locust bean gum belongs to a group of polysaccharides known as galactomannans. Locust bean gum is a polymer of mannose, wherein every four mannose units has a branched galactose side chain.

Other polysaccharides are prepared by enzymatic or microbial fermentation processes.

The present invention involves polysaccharides that have had a substituent group replace one or more of the hydroxyl groups in the saccharide unit. In this regard, the term "degree of substitution" refers to the average number of substituent groups per saccharide unit. The substituents are joined to the saccharide units by a linkage selected from the group consisting of ester, ether, amide linkages and combinations thereof.

The first step in preparing a chewing gum base of the present invention is to obtain a polysaccharide that, when the substitution reaction is carried out, will result in a suitable substituted polysaccharide that can act as an elastomer in the gum base. Many different polysaccharides may be used. In one preferred group, the polysaccharides have branches with an average length of 1 to 15 saccharide units per branch. Another preferred group of polysaccharides consist essentially of linked saccharide units selected from the group consisting of allose, altrose, mannose, gulose, idose, galactose, 3,6 anhydro galactose, sulfated 3,6 anhydro galactose, glucuronic acid, 4-o-methyl-glucuronic acid, esters of galacturonic acid, mannuronic acid, galacturonic acid and esters, aldobiouronic acid, fucose, rhamnose, sulfated galactose, arabinose, xylose, talose, acyl substituted glucose, 2-acetamido-2-deoxyl-glucose, fructose, lactose and their derivatives and combinations thereof. Particularly preferred in this group are galactomannans, which have a repeat chain of mannose units with a galactose attached every fourth mannose unit.

Suitable polysaccharides are typically from botanical, algal, microbial and animals. Examples of botanical derived polysaccharides are: cellulose; tree gum extrudates such as gum arabic, gum karaya, gum ghatti, gum tragacanth and mesquite gum; plant derived polysaccharides such as pectin, arabinoxylan, xyloglucan, arabinogalactan, xylan, arabinan, and cellulose; seed derived polysaccharides such as guar gum, locust bean gum, tara gum, tamarind gum, xyloglucan, arabinoxylan and cereal β-glucan; and tuber derived gum such as konjac mannan. Examples of algal derived polysaccharides are agar, carrageenan, furcellaran and alginate. Examples of microbial fermentation product polysaccharides are xanthan gum, curdlan, dextran, gellan gum, pullulan, scleroglucan, alternan, elsinan and levan. Examples of polysaccharides from animal sources are chitin and chitosan.

One particular preferred polysaccharide is locust bean gum. Other preferred polysaccharides in the present invention include cellulose, gum arabic, gum karaya, gum tragacanth, cereal β-glucan, gellan gum, guar gum, xanthan gum, curdlan, xyloglucan, pullulan, chitin and chitosan. In some embodiments the polysaccharides are produced by enzymatic fermentation or by microbial fermentation.

As noted above, polysaccharides consist of saccharide units linked together through glycosidic linkages. Suitable polysaccharides for use in the present invention will preferably have predominantly glycosidic linkages selected from the group consisting of β-1,4 linkages, β-1,3 linkages, β-1,2 linkages, α-1,2 linkages, β-1,5 linkages, α-1,6 linkages, α-1,3 linkages, α-1,5 linkages, β-1,6 linkages and combinations thereof.

In many embodiments of the invention, at least 90% the polysaccharides used in the gum base are branched. Preferably the branched polysaccharides have branches with an average length of 1 to 15 saccharide units per branch, preferably 10 units or less, and more preferably five units or less. It is believed that polysaccharides having branches in this range are resistant to forming crystalline domains. Formation of crystalline domains is undesirable because they can raise the $T_g$ of the substituted polysaccharide above 50° C., resulting in crumbly, excessively firm texture.

Table 1 below gives a listing of some biological sources of polysaccharides useful as starting materials of the present invention and lists the number of free hydroxyl groups available for substitution:

TABLE 1

| Name | Monosaccharide | Glycosidic Linkages | Free OH/per ring |
|---|---|---|---|
| Cellulose | glucose | β-1,4 | 3 |
| Gum Arabic | galactose, arabinose, rhamnose, glucuronic acid | β-1,3; β-1,6 | 2-3 |
| Gum Karaya | D-galacturonic acid, D-galactose, L-rhamnose, D-glucuronic acid, partial acetylated | α-1,4; α-1,2; β1,2; β1,3; β1,4; | 1-4 |
| Gum Ghatti | L-arabinose, D-galactose, D-mannose, D-xylose, D-glucuronic acid | β-1,6, β-1,3, β-1,2; α-1,4; α-1, 6; α-1,3, | 1-4 |
| Gum Tragacanth | galactose, arabinose, xylose, fucose, mannose, glucose, rhamnose | α-1,4; α-1,2; 1,6; β1,3; 1,5 | 2-4 |
| Mesquite Gum | D-galactose, L-arabinose, D-glucuronic acid, 4-O-methyl-D-glucuronic acid, D-glucose, D-mannose, D-xylose | β-1,3; β-1,6; β-1,2; β-1,3; β-1,4; β-1,6 | 1-3 |
| Xyloglucan | xylose, glucose | β-1,2; β-1,4; α-1,6; α-1,3 | 2-4 |
| Arabinoxylan | xylose, arabinose | β-1,3; β-1,4 | 1-4 |
| Arabinogalactan | D-galactose, L-arabinose | β-1,3; β-1,6 | 2-4 |
| Guar Gum | Mannose, galactose | α-1,6; β-1,4 | 2-4 |
| Tara Gum | Mannose, galactose | α-1,6; β-1,4 | 2-4 |
| Locust Bean Gum | Mannose, galactose | α-1,6; β-1,4 | 2-4 |
| Tamarind Gum | glucose, xylose, galactose | β-1,4, α-1,6, α-1,2 | 2-4 |
| Cereal β-glucan | glucose | β-1,3; β-1,4 | 3 |
| Konjac Mannan | glucose, mannose | β-1,4; β-1,3 | 2-3 |
| Agar | 3,6 anhydro L. galactose, D. galactose | α-1,3; β-1,4 | 1-3 |
| Carrageenan | 3,6 anhydro L. galactose, D. galactose (sulfated and non-sulfated) | alternating α-1,3; β-1,4 glycosidic links | 1-2 |
| Furcellaran | 3,6 anhydro L. galactose, D. galactose (sulfated and non-sulfated) | alternating α-1,3; β-1,4 glycosidic links | 1-2 |
| Alginate | β-D-mannuronate, α-L-guluronate | α-1,4; β-1,4 | 2 |
| Xanthan Gum | β-D-glucose, glucuronic acid salt (Na, K, Ca), mannose | β-1,4 | 2-3 |
| Curdlan | glucose | β-1,3 | 3 |
| Gellan Gum | Glucose, glucose acid, rhamnose, 4 tetrasaccharide repeat unit, acyl substitution on 3-linked glucose (position 2 and or 6) | α-1,3; β-1,4 | 2-3 |
| Pullulan | glucose | α-1,4; α-1,6 (30%); α-1,3 | 3 |
| Scleroglucan | glucose | β-1,3; β-1,6 | 2-4 |
| Alternan | glucose | α-1,3 (46%); α-1,6 (54%) | 3 |
| Elsinan | glucose | α-1,3; α-1,4 | 3 |
| Levan | fructose | β-2,1; β-2,6 | 2-3 |
| Dextran | glucose | α-1,6 (50-97%), α-1,2; α-1,3; α-1,4 | 2-3 |
| Chitin | 2-acetamido-2-deoxyl-D-glucose | β-1,4 | 2-3 |
| Chitosan | 2-acetamido-2-deoxyl-D-glucose | β-1,4 | 2-3 |

After selecting a suitable polysaccharide or mixture of polysaccharides, the polysaccharides will be reacted with suitable reagents to substitute some of the hydroxyl groups on the polysaccharides with substituents to produce a substituted polysaccharide. Some preferred acidulants that may be used to create substituted polysaccharides through esterification are listed in Table 2 below.

TABLE 2

| | Commercial Acidulants | structure |
|---|---|---|
| Alkanoic acid (mono) | Formic acid | HCOOH |
| | Acetic acid/anhydride | $CH_3COOH$ |
| | Propionic acid | $CH_3CH_2COOH$ |
| | Saturated Fatty acid | $CH_3(CH_2)_nCOOH$ n = 4~22 |
| Alkanoic acid (multi) | Succinic acid/anhydride | $HOOCCH_2CH_2COOH$ |
| | Adipic acid | $HOOC(CH_2)_4COOH$ |
| Monoenoic acid | Fumaric acid | HOOCCH=CHCOOH |
| | Octenyl succinic anhydride | $HOOCCH_2CH(C8H14)COOH$ |
| | Myristoleic acid | $HOOC(CH_2)_7CH=CH(CH_2)_3CH_3$ |
| | Palmitoleic acid | $HOOC(CH_2)_7CH=CH(CH_2)_5CH_3$ |
| | Oleic acid | $HOOC(CH_2)_7CH=CH(CH_2)_7CH_3$ |
| | Erucic | $HOOC(CH_2)_{11}CH=CH(CH_2)_7CH_3$ |
| Polyunsaturated acid | Sorbic acid | CH2CH=CH—CH=CH—COOH |
| | Linoleic acid | $HOOC(CH_2)_7(CH=CHCH_2)_2(CH_2)_3CH_3$ |
| | Linolenic acid | $HOOC(CH_2)_4(CH=CHCH_2)_3(CH_2)_3CH_3$ |
| Hydroxyalkanoic acid | Lactic acid | $CH_3CH(OH)COOH$ |
| | Malic acid | $HOOCCH(OH)CH_2COOH$ |
| | Tartaric acid | HOOCCH(OH)CH(OH)COOH |
| | Citric acid | $HOOCCH_2C(COOH)(OH)CH_2COOH$ |

The substituents chosen and the degree of substitution will cause the substituted polysaccharide to have the requisite properties to be able to function as an elastomer in the chewing gum base. Most typically the substituents are selected from the group consisting of alkyl, aryl, alkenyl, alkynyl, carbonyl, carbonate ester, ester, peroxy, ether, hemiacetal, hemiketal, acetal, ketal, orthoester, orthocarbonate ester, carboxamide, primary amine, secondary amine, tertiary amine, primary ketimine, secondary ketimine, primary aldimine, secondary aldimine, imide, Azo, sulfide, disulfide, sulfinyl, sulfonyl, carbonothioyl, phosphino, phosphate and combinations thereof. Particularly preferred are substituents selected from the group consisting fatty acid alkyl esters, fatty acid alkyl ethers and combinations thereof. Fatty acid alkyl esters having between 6 and 20 carbon atoms, and in particular fatty acid alkyl esters comprising lauroyl chains, are most preferred for some of the preferred polysaccharides.

The reaction is carried out for a length of time and under conditions that will result in the substituents on the saccharide units in the polysaccharides producing a degree of substitution of at least 1.0. Preferably the reaction will produce a degree of substitution of at least 1.5, more preferably a degree of substitution of at least 1.8, and most preferably a degree of substitution of at least 2.0. As seen in the example below, it may be necessary to carry out the substitution reaction in multiple steps to obtain the desired degree of substitution.

The molecular weight of the substituted polysaccharide will be selected to provide the desired textural properties when incorporated into a chewing gum base or chewing gum. The optimal molecular weight for this purpose will vary depending upon the composition of the gum base or gum product. The polysaccharide chosen for the substitution, the substituents chosen, and the degree of substitution will preferably result in the substituted polysaccharides having a weight average molecular weight of between $10,000$-$10^9$ daltons, and preferably between $10^5$-$10^7$ daltons. In some embodiments, particularly if substituted galactomannans are used, the polysaccharides prior to substitution will preferably have a weight average molecular weight between about 300,000 and 360,000 daltons.

A variety of gum base and chewing gum formulations including substituted polysaccharide can be created and/or used in the present invention. In some embodiments, a substituted polysaccharide may be used as the sole elastomer, or it may be combined with other base elastomers for use in the chewing gum base. The gum base will typically comprise from 5 to 95% substituted polysaccharide by weight of the gum base, preferably 5 to 90% substituted polysaccharide by weight of the gum base, and more preferably from 50 to 85% substituted polysaccharide by weight of the gum base.

In some embodiments, the gum base comprises from 1 to 50% by weight of at least one polymer other than the substituted polysaccharides, preferably from 5 to 40% by weight of at least one elastomer other than the substituted polysaccharide. Such other elastomers, where used, include synthetic elastomers including polyisobutylene, as well as isobutylene-isoprene copolymers (butyl rubber), styrene-butadiene copolymers, polyisoprene, polyolefin thermoplastic elastomers such as ethylene-propylene copolymer and ethylene-octene copolymer and combinations thereof. Natural elastomers that can be used in the gum base in addition to the substituted polysaccharide include natural rubbers such as chicle and proteins such as zein or gluten. In some embodiments, the substituted polysaccharide may be blended with removable or environmentally degradable homopolymers such as polylactides, and polyesters prepared from food acceptable acids and alcohols. In preferred embodiments, the at least one polymer other than the substituted polysaccharides comprises a polymer selected from the group consisting of butyl rubber, styrene-butadiene rubber (SBR), polyvinyl acetate, polyethylene and combinations thereof.

The substituted polysaccharide used in the gum bases of the present invention will be "food acceptable". This means that it will not contain any byproducts or residual products that are harmful to humans at the level present in the product.

It is preferable that the substituted polysaccharide used in the present invention be food grade. While requirements for being food grade vary from country to country, food grade polymers intended for use as masticatory substances (i.e. gum base) will typically have to meet one or more of the following criteria. They may have to be approved by local food regulatory agencies for this purpose. They may have to be manufactured under "Good Manufacturing Practices" (GMPs) which may be defined by local regulatory agencies, such practices ensuring adequate levels of cleanliness and safety for the manufacturing of food materials. Materials (including reagents, catalysts, solvents and antioxidants)

used in the manufacture will desirably be food grade (where possible) or at least meet strict standards for quality and purity. The finished product may have to meet minimum standards for quality and the level and nature of any impurities present. The manufacturing history of the material may be required to be adequately documented to ensure compliance with the appropriate standards. The manufacturing facility itself may be subject to inspection by governmental regulatory agencies. Again, not all of these standards may apply in all jurisdictions. As used herein, the term "food grade" will mean that the substituted polysaccharide meets all applicable food standards in the locality where the product is manufactured and/or sold.

In some embodiments, the present invention provides for gum base formulations which are conventional gum bases that include wax or are wax-free. In some embodiments, the present invention provides for chewing gum formulations that can be low or high moisture formulations containing low or high amounts of moisture-containing syrup. Low moisture chewing gum formulations are those which contain less than 1.5% or less than 1% or even less than 0.5% water. Conversely, high moisture chewing gum formulations are those which contain more than 1.5% or more than 2% or even more than 2.5% water. The substituted polysaccharide gum base of the present invention can be used in sugar-containing chewing gums and also in low sugar and non-sugar containing gum formulations made with sorbitol, mannitol, other sugar alcohols, and non-sugar carbohydrates.

In some embodiments, the substituted polysaccharide may be the sole component of the water insoluble gum base. In other embodiments, the substituted polysaccharide and possible other elastomers will be combined with softeners, fillers, antioxidants and other conventional, non-elastomeric gum base components. In some embodiments, the substituted polysaccharide gum bases may be used to replace conventional gum bases in chewing gum formulas which additionally contain water-soluble bulking agents, flavors, high-intensity sweeteners, colors, pharmaceutical or nutraceutical agents and other optional ingredients. These chewing gums may be formed into sticks, tabs, tapes, coated or uncoated pellets or balls or any other desired form. By substituting substituted polysaccharide for a portion or all of the conventional gum base elastomers, consumer-acceptable chewing gum products can be manufactured.

The substituted polysaccharide, when used according to the present invention, affords the chewing gum consumer acceptable texture. Because the substituted polysaccharide has chewing properties similar to other elastomers in most respects, gum bases containing substituted polysaccharide create a resultant chewing gum product that has a high consumer-acceptability.

When used to formulate a gum base of the present invention, it is preferred that the substituted polysaccharide be plasticized with a suitable plasticizing agent to form an elastomeric material which, when formulated as a gum base, has sufficient chewing cohesion to be cud-forming and chewable at mouth temperatures. Plasticizers typically function to lower the $T_g$ of a polymer to make the gum cud chewable at mouth temperature. Suitable plasticizing agents are substances of relatively low molecular weight which have a solubility parameter similar to the polymer so they are capable of intimately mixing with the polymer and reducing the $T_g$ of the mixture to a value lower than the polymer alone. Generally, any food acceptable plasticizer which functions to soften the substituted polysaccharide and render it chewable at mouth temperature will be a suitable plasticizer. Plasticizers which may be used in the present invention include triacetin, phospholipids such as lecithin and phosphatidylcholine, triglycerides of $C_4$-$C_6$ fatty acid such as glycerol trihexanoate, polyglycerol, polyricinoleate, propylene glycol di-octanoate, propylene glycol di-decanoate, triglycerol penta-caprylate, triglycerol penta-caprate, decaglyceryl hexaoleate, decaglycerol decaoleate, citric acid esters of mono- or di-glycerides, polyoxyethylene sorbitan such as POE (80) sorbitan monolaurate, and POE (20) sorbitan monooleate.

Fats, waxes and acetylated monoglycerides can enhance the effect of the suitable plasticizers when incorporated into the gum bases of the present invention. However, fats and waxes may not be suitable for use as the sole plasticizers in these compositions.

The water-insoluble gum base of the present invention may optionally contain conventional petroleum-based elastomers such as styrene-butadiene rubber, isobutylene-isoprene copolymer, polyisobutylene and polyisoprene, and may contain elastomer solvents such as terpene resins and rosin esters. Where used, these conventional elastomer solvents may be combined in any compatible ratio with the substituted polysaccharide. Other ingredients which may optionally be employed include inorganic fillers such as calcium carbonate and talc, emulsifiers such as lecithin and mono- and di-glycerides, plastic resins such as polyvinyl acetate (PVAc), polyvinyl laurate, and vinyl acetate-vinyl laurate copolymers and antioxidants.

A typical gum base useful in this invention includes about 5 to 95% substituted polysaccharide, 0 to 20% synthetic elastomer, 0 to 20% natural elastomer, about 0 to about 40% by weight elastomer solvent, about 1 to about 50% filler, and about 0 to about 35% softener. Further, a typical gum base includes at least 5% and more typically at least 10% softener and includes up to 35% and more typically up to 30% softener. Still further, a typical gum base includes 5 to 40% and more typically 15 to 30% hydrophilic modifiers such as polyvinyl acetate. Minor amounts (e.g., up to about 1%) of miscellaneous ingredients such as antioxidants and the like also may be included into a gum base of the present invention.

In an embodiment, a chewing gum base of the present invention contains about 4 to about 35% filler, about 5 to about 35% softener, about 5 to about 40% hydrophilic modifier and optional minor amounts (about one percent or less) of miscellaneous ingredients such as antioxidants and the like.

Additional elastomers may include, but are not limited to, polyisobutylene having an average molecular weight of about 55,000 to about 510,000 daltons; isobutylene-isoprene copolymer (butyl rubber) with average molecular weight of about 500,000 daltons; polyolefin thermoplastic elastomers such as ethylene-propylene copolymer and ethylene-octene copolymer, styrene-butadiene copolymers having styrene-butadiene ratios of about 1:3 to about 3:1 and/or polyisoprene; and combinations thereof. Natural elastomers which may be similarly incorporated into the gum bases of the present inventions include jelutong, lechi caspi, perillo, sorva, massaranduba balata, massaranduba chocolate, nispero, rosindinha, chicle, gutta hang kang, and combinations thereof.

A typical gum base containing substituted polysaccharide of the present invention may have a complex viscosity, measured as a gum cud at 37° C., of between $1*10^3$ and $1*10^7$ Poise. Gum bases having a complex viscosity in this range have been found to have acceptable chewing properties.

A suitable substituted polysaccharide used in this invention typically should be free of strong, undesirable off-tastes (i.e. objectionable flavors which cannot be masked) and have an ability to incorporate flavor materials which provide a consumer-acceptable flavor sensation.

Typically, the substituted polysaccharide will have sufficient chewing cohesion such that a chewing gum composition containing such material forms a discrete gum cud with consumer acceptable chewing characteristics.

Elastomer solvents commonly used for petroleum-based elastomers may be optionally used in this invention including but are not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing. The preferred elastomer solvents also will vary depending on the specific application, and on the type of elastomer which is used. A preferred gum base of the present invention will comprise from 1 to 40% elastomer solvent.

The gum base may also include plastic resins. These include polyvinyl acetate having a GPC weight average molecular weight of about 2,000 to about 200,000 daltons, polyethylene, vinyl acetate-vinyl laurate copolymer having a vinyl laurate content of about 5 to about 50% of the copolymer, and combinations thereof. Preferred weight average molecular weights (by GPC) for polyvinyl acetate are between 8,000 daltons and 100,000 daltons.

Additionally, a gum base may include fillers, texturizers and softeners/emulsifiers. Softeners (including emulsifiers) are added to chewing gum in order to optimize the chewability and mouth feel of the gum.

Softeners/emulsifiers that typically are used include tallow, hydrogenated tallow, hydrogenated and partially hydrogenated vegetable oils, cocoa butter, mono- and di-glycerides such as glycerol monostearate, acetylated mono- and di-glycerides, glycerol triacetate, lecithin, paraffin wax, microcrystalline wax, natural waxes and combinations thereof. Lecithin and acetylated and non-acetylated mono- and di-glycerides also function as emulsifiers to improve compatibility of the various gum base components. A preferred gum base of the present invention may comprise from 1 to 20% by weight of emulsifier. A preferred gum base of the present invention may also comprise from 1 to 30% wax. A preferred wax will have a melting point of at least 80° C. A preferred gum base may also comprise from 1 to 40% by weight of a fat. Preferred fats include hydrogenated soybean oil, partially hydrogenated soybean oil, hydrogenated cotton seed oil, partially hydrogenated cotton seed oil, hydrogenated palm oil, partially hydrogenated palm oil, hydrogenated vegetable oil, partially hydrogenated vegetable oil and mixtures thereof.

Fillers/texturizers typically are inorganic, water-insoluble powders such as magnesium and calcium carbonate, ground limestone, silicate types such as magnesium and aluminum silicate, clay, alumina, talc, titanium oxide, mono-, di- and tri-calcium phosphate and calcium sulfate. Insoluble organic fillers including cellulose polymers such as wood as well as combinations of any of these also may be used. A preferred gum base of the present invention will comprise from 1 to 50% filler, and more preferably from 15 to 40% filler.

Selection of various components in chewing gum bases or chewing gum formulations of this invention typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, may be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

A chewing gum of this invention typically constitutes approximately 5 to about 95% water-insoluble gum base; more commonly, chewing gum of this invention comprises 10 to about 50% gum base; and in some preferred embodiments, 20 to about 45% gum base.

In addition to a water-insoluble gum base portion, a typical chewing gum composition includes a water-soluble bulk portion (or bulking agent) and one or more flavoring agents. The water-soluble portion can include high intensity sweeteners, binders, flavoring agents (which may be water insoluble), water-soluble softeners, gum emulsifiers, colorants, acidulants, fillers, antioxidants, and other components that provide desired attributes.

Water-soluble softeners, which may also be known as water-soluble plasticizers and plasticizing agents, generally constitute between approximately 0.5 to about 15% of the chewing gum. Water-soluble softeners may include glycerin, lecithin, and combinations thereof. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener is useful in chewing gums of this invention to provide sweetness, bulk and texture to the product. Typical bulking agents include sugars, sugar alcohols, and combinations thereof. Bulking agents typically constitute from about 5 to about 95% of the chewing gum, more typically from about 20 to about 80% and, still more typically, from about 30 to about 70% of the gum. Sugar bulking agents generally include saccharide containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder; softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and U.S. Patent Application Publication No. 2004-234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed. In the case of syrups and other aqueous solutions, it is generally desirable to use the minimum practical level of water in the solution to the minimum necessary to keep the solution free-flowing at acceptable handling temperatures. The usage level of such syrups and solutions should be adjusted to limit total moisture in the gum to less than 3%, preferably less than 2% and most preferably less than 1%.

High intensity sweeteners can also be used in combination with the above-described sweeteners. Preferred sweeteners include, but are not limited to sucralose, aspartame, salts of acesulfame, alitame, neotame, saccharin and its salts, cyclamic acid and its salts, glycyrrhizin, stevia and stevia compounds such as rebaudioside A, dihydrochalcones, thaumatin, monellin, lo han guo, stevia and the like, alone or in combination. In order to provide longer lasting sweetness and flavor perception, it may be desirable to encapsulate or otherwise control the release of at least a portion of the high intensity sweetener. Such techniques as wet granulation, wax granulation, spray drying, spray chilling, fluid bed coating, coacervation, and fiber extrusion may be used to achieve the desired release characteristics.

Usage level of the high intensity sweetener will vary greatly and will depend on such factors as potency of the sweetener, rate of release, desired sweetness of the product, level and type of flavor used and cost considerations. Thus, the active level of high intensity sweetener may vary from 0.02 to about 8%. When carriers used for encapsulation are included, the usage level of the encapsulated sweetener will be proportionately higher. A preferred gum composition may comprise at least one of an encapsulated flavor and encapsulated sweetener.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 10% of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorial acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

In addition to typical chewing gum components, chewing gums of the present invention may include active agents such as dental health actives such as minerals, nutritional supplements such as vitamins, health promoting actives such as antioxidants for example resveratrol, stimulants such as caffeine, medicinal compounds and other such additives. These active agents may be added neat to the gum mass or encapsulated using known means to prolong release and/or prevent degradation. The actives may be added to coatings, rolling compounds and liquid or powder fillings where such are present.

It may be desirable to add components to the gum or gum base composition which enhance environmental degradation of the chewed cud after it is chewed and discarded.

The present invention may be used with a variety of processes for manufacturing chewing gum including batch mixing, continuous mixing and tableted gum processes.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first softening or melting the gum base and adding it to the running mixer. The gum base may alternatively be softened or melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from about fifteen to about twenty minutes for production scale equipment, although longer mixing times are sometimes required.

Of course, many variations on the basic gum base and chewing gum mixing processes are possible.

After mixing, the chewing gum mass may be formed, for example by rolling or extruding into and desired shape such as sticks, tabs, chunks or pellets. The product may also be filled (for example with a liquid syrup or a powder) and/or coated for example with a hard sugar or sugar alcohol coating using known methods.

After forming, and optionally filling and/or coating, the product will typically be packaged in appropriate packaging materials. The purpose of the packaging is to keep the product clean, protect it from environmental elements such as oxygen, moisture and light and to facilitate branding and retail marketing of the product.

EXAMPLES

The following examples of the invention are provided to illustrate, but not to limit, the invention which is defined by the attached claims. Amounts listed are in weight percent.
Chemical Modifications of Locust Bean Gum Locust bean gum consists of high molecular weight hydrocolloidal polysaccharides, composed of galactose and mannose units combined through glycosidic linkages, which may be described chemically as galactomannan. In locust bean gum, the galactomannans have a molecular weight of 330,000±30,000. The galactomannan may be represented as follows:

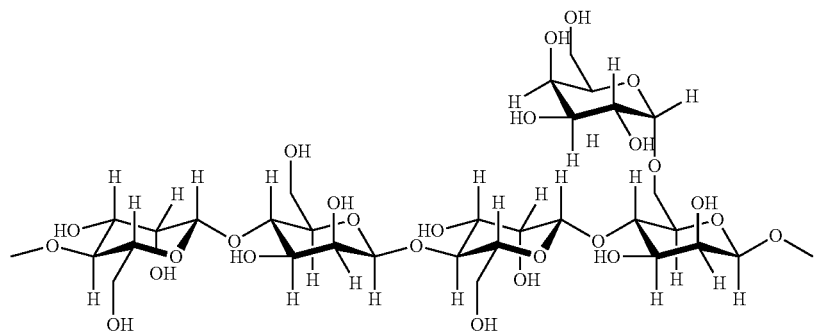

Locust bean gum was esterified with acetic anhydride, heptanoyl chloride, decanoyl chloride, and lauroyl chloride to form Ac-LBG, HC-LBG, DC-LBG, and LC-LBG respectively. A reaction mechanism for the preparation was as follows:

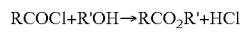

Ac-LBG was powder at room temperature. HC-LBG and DC-LBG had some elastic properties and LC-LBG had good elastic properties at room temperature. As expected, Ac-LBG, HC-LBG, DC-LBG, and LC-LBG all had superior hydrophobicity and could be melted. The melting temperature decreased along with the increase in the chain length of the acylating agent, i.e., the melting temperature had the following order: Ac-LBG>HC-LBG>DC-LBG>LC-LBG. The elasticity also appeared to increase along with the increase in the chain length of the acylating agent, i.e., the elasticity had the following order: Ac-LBG<HC-LBG<DC-LBG<LC-LBG. It should be noted that the melting temperature and the elasticity appeared to be highly dependent upon the degree of substitution, the evidence being that the resulting products from double esterification reactions had a lower melting temperature and was more elastic than those from single-step esterification. Samples of locust bean gum were therefore treated to different esterification reactions to prepare samples for use in making chewing gum base. The reaction conditions for some of these samples are listed below and in Table 3.

Chemical Modification Procedures—First Esterification:

Locust bean gum, a glactomannan, (pale yellow hard powder, 30.55 g) was dried overnight in an oven at 103° C. to remove moisture. The dry locust bean gum (dry weight, 26.7 g, 495 mmol), DMF (100 mL, dried over molecular sieve prior to use) and pyridine (82 mL; dried over molecular sieve prior to use) were added into a 500 mL, round-bottom flask equipped with a condenser and a magnetic stirrer. The mixture was heated to 80° C. (oil bath) and stirred for 25 minutes. The heat was removed, and the pale-yellowish mixture was cooled to room temperature.

To this dispersion, lauroyl chloride (166.0 g) was added drop-wise from a pressure-equalizing funnel, with vigorous stirring over 45 minutes at room temperature. After the addition, the brown dispersion was heated to 80° C. (oil bath), and stirred for additional 63 hours. The heat was removed; the dark-brown mixture was cooled to room temperature, and then poured with vigorous stirring into 500 mL of water, followed by filtration to give dark, soft "paste".

The crude product was mixed with 450 mL of chloroform, and the mixture was stirred at room temperature for 15 minutes to get dark-brown semi-fluid, which was then poured into 500 mL of methanol with vigorous stirring. The stirring was continued for additional 20 minutes. The black mixture was filtered off, and the residue was washed with 300 mL of MeOH and filtered off again to give a flexible product (wet weight, 128.5 g).

The crude product was mixed with 450 mL of chloroform. The mixture was stirred at room temperature for an hour, followed by wash twice with water (2*500 mL). Then the $CHCl_3$ layer was collected and poured into 500 mL of MeOH, followed by filtration to give yellowish orange, sort of elastic, soft pellet, which was then dried in an oven at 50° C. for 1 hr and under vacuum overnight, respectively, to give 51.4 g (dry weight) of yellowish-orange, elastic, sort of sticky product.

TABLE 3

Experimental Conditions and Results for the Preparation of Acylation Derivatives of Locust Bean Gum[1]

| Sample # | Locust Bean Gum/g (mmol-OH group) | Acylating Agents/g (mmol) | Bases/g (mmol) | Solvents/mL | Hydroxyl group: Acylating agent: Base | Temp/ ° C. (oil bath) | Time/ hr | Purification (solvent/ Non-solvent) | Yield[2]/g (%) | Appearance | Thermal properties |
|---|---|---|---|---|---|---|---|---|---|---|---|
| #1 | 4.50 (83.3) | Lauroyl chloride 27 g (83.3*1.5) | Pyridine 20 mL (248) | DMF 100 mL | 1.0:1.5:3.0 | 78 | 48 | DMF/EtOH EtOH Acetone | 13-11.3 (57.1%) | Yellow, sort of elastic lump | $T_g$~145° C. (80-180° C.); Softening temp.~90° C.[3]; melting temp.: 150-230° C.[3] |

TABLE 3-continued

Experimental Conditions and Results for the Preparation of Acylation Derivatives of Locust Bean Gum[1]

| Sample # | Locust Bean Gum/g (mmol-OH group) | Acylating Agents/g (mmol) | Bases/g (mmol) | Solvents/ mL | Hydroxyl group: Acylating agent: Base | Temp/ °C. (oil bath) | Time/ hr | Purification (solvent/ Non-solvent) | Yield[2]/g (%) | Appearance | Thermal properties |
|---|---|---|---|---|---|---|---|---|---|---|---|
| #2 | 6.00 (111) | Lauroyl chloride 36.5 g (167) | Pyridine 17.6 g (223) | DMF 120 mL | 1.0:1.5:2.0 | 80 | 40 | DMF/water CHCl$_3$/MeOH | ~9.75 (37.1%*) | Yellowish-brown, soft lump | |
| #3 | 26.7 (495) | Lauroyl chloride 36.5 g (742) | Pyridine 80.2 g (1014) | DMF 120 mL | 1.0:1.5:2.0 | 80 | 64 | DMF/water CHCl$_3$/MeOH | ~51.4 (44.0%*) | Yellowish-orange, elastic lump | |

[1]Abbreviations: DMF, Dimethylformamide; DMAP, 4-Dimethylaminopyridine; DMAc, N,N-Dimethylacetamide; NMP, N-methyl-2-pyrrolidone; DCM, Dichloromethane; DS, Degree of Substitution.
[2]The data were based on the wet weight of the products, except those marked with asterisks which were based on dry weight.
[3]The data were obtained based on the pure laurate derivative of locust bean gum, which had been subject to extraction of unreacted locust bean gum.

Second Esterification

Some of the locust bean gum laurate from the first step was dried in an oven at 103° C. for 2 hours to remove moisture. The dried sample (43.8 g), chloroform (80 mL), DMF (160 mL; dried over molecular sieve prior to use), and pyridine (50 mL; dried over molecular sieve prior to use) were added in turn into a 500 mL, round-bottom flask equipped with a condenser and a magnetic stirrer. The mixture was heated to 65° C. (oil bath) and stirred for 2 hours to get a brown solution with yellow dispersion.

The heat was removed; the mixture was cooled to room temperature, and lauroyl chloride (84.6 g) was added dropwise from a pressure-equalizing funnel, with vigorous stirring over an hour at room temperature. After the addition, the dark-brown dispersion was heated to 65° C. (oil bath), and stirred for additional 71 hours. The heat was removed; the mixture was cooled to room temperature, followed by addition of 300 mL of methanol with vigorous stirring. The mixture was filtered off to give 117.3 g (wet weight) of brown (locally yellow), sort of elastic and sticky lump, which was then mixed with 500 mL of chloroform. The mixture was stirred at room temperature for 2 days, to get a dark brown solution with some dispersion.

The mixture was washed four times with water (4*400 mL), then the CHCl$_3$ layer was collected and poured into 500 mL of MeOH, followed by decantation to give yellow, sort of sticky soft lump, which was then dried in an oven at 50° C. for 1 hr and under vacuum overnight, respectively, to get 61.6 g (dry weight) of brown, sort of elastic, tough and sticky lump. Some of the samples that were treated to this second step are listed in Table 4 below.

TABLE 4

Experimental Conditions and Results for Re-acylation of Locust Bean Gum Derivatives

| Sample # | Starting material/g | Acylating agent/g (mmol) | Base/g (mmol) | Solvent/ mL | Acylating agent: Base | Temp./ °C. (oil bath) | Time/ hr | Purification (solvent/ nonsolvent) | Yield[1]/g | Appearance |
|---|---|---|---|---|---|---|---|---|---|---|
| #4 | Sample #1 5.0 g | Lauroyl chloride 24.0 g (110) | Pyridine 20.0 g (253) | NMP 121 mL CHCl$_3$ 60 mL | 1.00:2.30 | 60 | 40.5 | CHCl$_3$/MeOH CHCl$_3$/MeOH | ~1.5 g | Pale-brown, "chewing gum" |
| #5 | Sample #2 6.55 g | lauroyl chloride 9.5 g (43.4) | Pyridine 4.6 g (56.3) | DMF 80 mL | 1.00:1.30 | 80 | 14.5 | DMF/water CHCl$_3$/MeOH | ~9.3 g* | yellow, soft pellet |
| #6 | Sample #3 43.8 g | lauroyl chloride 84.6 g (386.7) | Pyridine 49.0 g (619) | DMF 160 mL CHCl$_3$ 80 mL | 1.00:1.60 | 65 | 72 | CHCl$_3$/MeOH CHCl$_3$/MeOH | ~61.6 g* | brown, sort of elastic, tough, sticky lump |
| #7 | Sample #3 7.6 g and Sample #5 7.6 g | lauroyl chloride 38.0 g (174) | Pyridine 24.5 g (310) | NMP 120 mL | 1.00:1.78 | 80 | 95 | NMP/MeOH CHCl$_3$/MeOH | ~15.1 g* | yellow, sort of elastic lump |

[1]The data were based on the wet weight of the products, except those marked with asterisks which were based on dry weight.

The double laurylated locust bean gum (LLBG) of Sample #6 was a soft light brown matrix, and was evaluated for chewing base applications. The following Example 1 chewing gum base was made in a 60 gram batch using a Haake brand mixer using a roller blade, operated at 42 rpm and 120° C., using the process outlined in Table 5.

TABLE 5

Example 1 Gum Base

| Addition time (min) | ingredient | % |
|---|---|---|
| 0 | LLBG (Sample #6) | 60.00 |
| 0 | CaCO$_3$ | 23.00 |
| 15 | Mono- and di-glycerides | 4.16 |
| 23 | Hydrogenated soybean oil | 5.78 |
| 26 | Hydrogenated cottonseed oil | 7.00 |
| 28 | BHA | 0.06 |
| 36 | Total | 100.00 |

The above gum base was made into Example 2 chewing gum in a 80 gram batch using the ingredients in the following table using a Haake brand mixer with a sigma blade, operated at 42 rpm and 55° C., using the process outline in Table 6.

TABLE 6

Example 2 Chewing gum

| Addition time (min) | ingredient | % |
|---|---|---|
| 0 | LLBG gum base (Example 1) | 32.00 |
| 0 | Sorbitol | 45.00 |
| 0 | Mannitol | 3.00 |
| 3 | Sugarless syrup | 15.00 |
| 3 | Glycerin | 3.50 |
| 5 | Peppermint flavor | 1.00 |
| 8 | Aspartame | 0.50 |
| 11 | Total | 100.00 |

Figure 2:
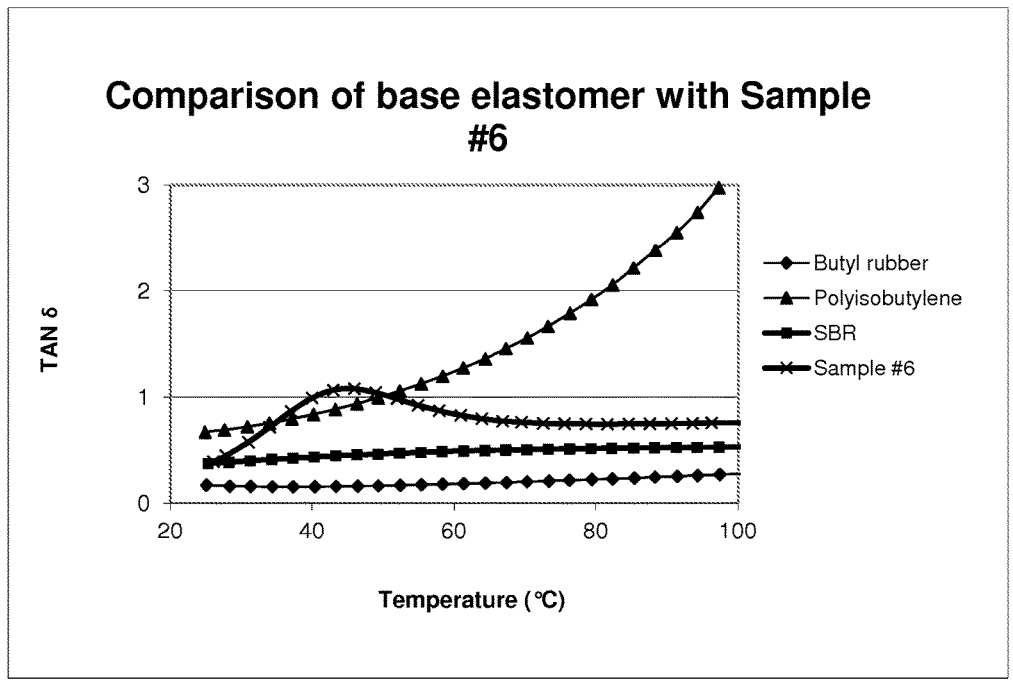
FIG. 2 is a graphical illustration comparing Tan δ as a function of temperature for a sample of substituted polysaccharide and three conventional chewing gum base elastomers.

FIGS. 1 and 2 show the complex viscosity and the Tan δ respectively at various temperatures of the substituted polysaccharide Sample #6 compared to butyl rubber, styrene-butadiene rubber and polyisobutylene. Complex viscosity (reported in units of Poise (P)) is a good characteristic to compare for polymers considered for use in gum bases. The complex viscosity is the complex modulus divided by the angular frequency. The complex modulus is the overall resistance to deformation of a material, regardless of whether that deformation is recoverable (elastic) or non-recoverable (viscous). Tan δ is the ratio of loss modulus to storage modulus. The substituted polysaccharide sample had complex viscosity similar to polyisobutylene at temperatures where the gum base is manufactured. These test results were obtained under the following conditions:
INSTRUMENTATION: Rheometric Dynamic Analyzer RDA III.
TESTING METHOD #1: Weigh a 1.5 g polymer sample and make it into disk-like shape with thickness >2 mm; Geometry Type=Parallel Plates (ParaPlate); Diameter=25.0 mm; Test Type=Dynamic temperature sweep (DTempSwp); Strain=0.5%; Temperature=−20~120° C.; Frequency=10 rad/s.

Figure 3:
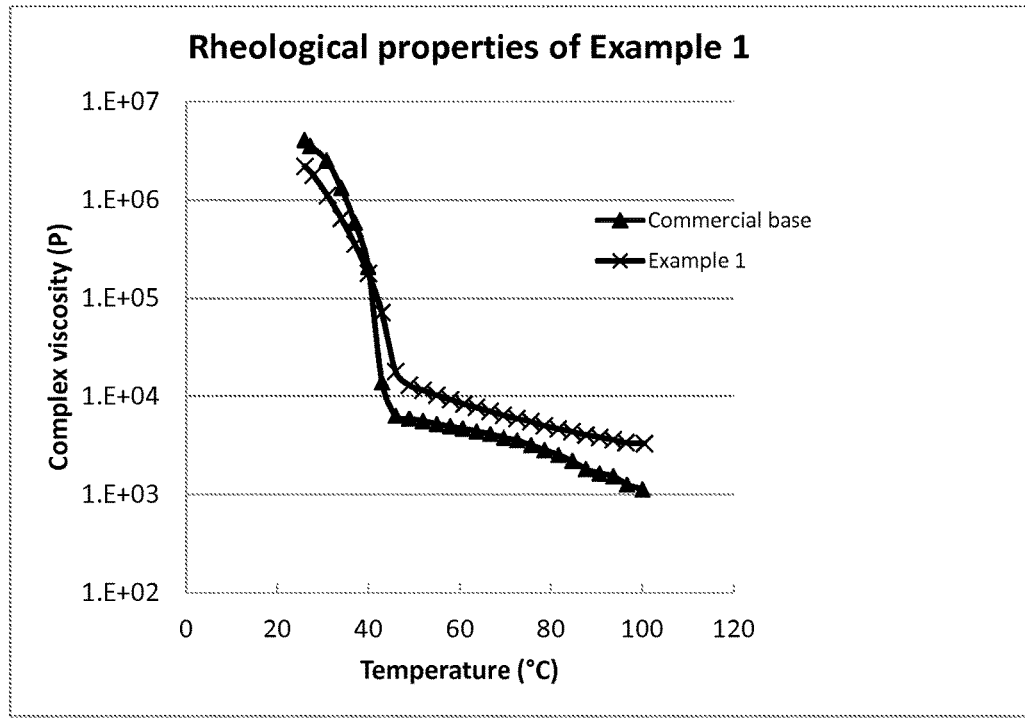
FIG. 3 is a graphical illustration comparing the complex viscosity as a function of temperature for a sample of a gum base made from a substituted polysaccharide and a commercial gum base.

FIG. 3 shows the complex viscosity at various temperatures of the Example 1 gum base compared to a chewing gum base used in commercial chewing gum products. The test data was obtained using the same test method #1 as noted above for obtaining the complex viscosity of the substituted polysaccharide samples. The rheological properties of the Example 1 gum base made with substituted polysaccharide showed a similar complex viscosity profile to the comparative gum base.

The Example 2 chewing gum was kneaded under water to simulate chewing and produce a cud. An ultrasonic water bath was used, with ultrasonic agitation for 10 minutes, followed by finger kneading under fresh running water for five minutes, with these cycles repeated for a total of one hour. Four rheological properties of the gum cud from the Example 2 chewing gum were tested and compared to rheological properties of gum cuds from three commercial chewing gum products. The properties tested were: (1) Viscosity—The resistance of a fluid to flow. In shear deformation, viscosity is the ratio of applied shear stress to resulting shear rate, reported in units of Poise; (2) Storage Modulus (G', reported in units of dyn/cm$^2$)—The contribution of elastic (solid-like) behavior to the complex modulus; (3) Loss Modulus (G", reported in units of dyn/cm$^2$)—The contribution of viscous (liquid-like) behavior to the Complex Modulus; and (4) Tan δ (Tan Delta)—The tangent of the phase angle, the ratio of loss modulus to storage modulus and a useful quantifier of the presence and extent of elasticity in a fluid, the relative degree of damping of the material. This is an indicator of how efficiently a material loses energy to molecular rearrangements and internal friction.

These test results were obtained under the following conditions:
INSTRUMENTATION: Rheometric Dynamic Analyzer RDA III.
TESTING METHOD #2: Weigh a 1.5 g sample and make it into disk-like shape with thickness >2 mm; Geometry Type=Parallel Plates (ParaPlate); Diameter=25.0 mm; Test Type=Dynamic Strain Frequency Sweep (DFreqSwp); Strain=0.5%; Temperature=37° C.; Frequency=0.1-100 rad/s.

Figure 4:
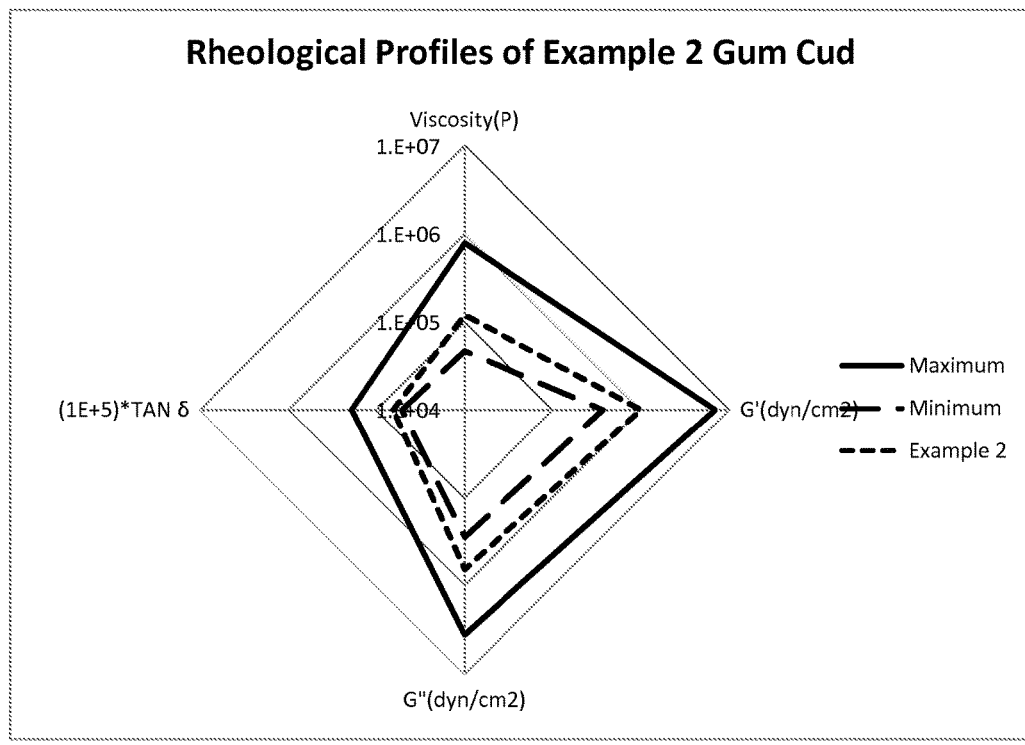
FIG. 4 is a spider chart depicting profiles of four different rheological properties of a gum cud from a chewing gum made according to the present invention compared to the maximum and minimum rheological properties of cuds from several select commercial chewing gum products.

The results of the tests are shown in FIG. 4. In these spider charts, the center of the chart represents a value of 1*10$^4$, and each succeeding further out line has a value of 10 times the value of the previous point or line. (The Tan δ values are reported multiplied by 1*10$^5$ so that they can be represented on the same scales on the spider chart.) In FIG. 4 the "Maximum" and "Minimum" data represent values for the maximum and minimum values of the four rheological properties for the three commercial products. Even though one commercial product did not produce all of the maximum values or all of the minimum values, it is helpful to compare a cud from a given sample chewing gum composition to the composite maximum and minimum values of the three commercial chewing gum compositions.

From the charts of FIGS. 1 and 2 it can be seen that laurylated locust bean gum (LLBG) has a steeper change with respect to temperature than conventional rubbers used in chewing gum bases. At 37° C., the sample LLBG is firmer than conventional rubbers used in chewing gum bases. It has a transition at 45° C. From the chart of FIG. 3 it can be seen that the Example 1 chewing gum base containing LLBG showed similar transition to the commercial gum base, and can be processed at current gum base processing temperatures. The chart of FIG. 4 shows that the rheology profile of Example 2 chewing gum cud containing LLBG is within the commercial gum cud boundary for all four of the rheological properties discussed above. Thus LLBG is an elastomer than can be used as a chewing gum base elastomer. The results of these tests demonstrated that gum base made from a substituted polysaccharide can perform similar to commercial base in gum, particularly in replacing butyl rubber.

Additional examples of gum bases that could be made using laurylated locust been gum are given in Table 7 below.

TABLE 7

| Ingredient | Example 3 % | Example 4 % | Example 5 % | Example 6 % | Example 7 % |
|---|---|---|---|---|---|
| LLBG (Sample #6) | 10.04 | 30.04 | 50.04 | 69.94 | 89.94 |
| Polyisobutylene | 1.4 | 1.1 | 0.8 | 0.5 | 0.2 |
| Butyl rubber | 7.8 | 6.1 | 4.3 | 2.6 | 0.9 |
| Resin | 19.8 | 15.4 | 11.0 | 6.6 | 2.2 |
| PVAc | 21.6 | 16.8 | 12.0 | 7.2 | 2.4 |
| Calcium carbonate | 19.8 | 15.4 | 11.0 | 6.6 | 2.2 |
| Hydrogenated cottonseed oil | 3.8 | 2.9 | 2.1 | 1.3 | 0.4 |
| Hydrogenated soybean oil | 3.9 | 3.0 | 2.2 | 1.3 | 0.4 |
| Glycerol monostearate | 3.6 | 2.8 | 2.0 | 1.2 | 0.4 |
| Partially hydrogenated cottonseed oil | 3.7 | 2.9 | 2.0 | 1.2 | 0.4 |
| Lecithin | 0.9 | 0.7 | 0.5 | 0.3 | 0.1 |
| Wax | 3.6 | 2.8 | 2.0 | 1.2 | 0.4 |
| BHA | 0.06 | 0.06 | 0.06 | 0.06 | 0.06 |
| Total | 100.0 | 100.0 | 100.0 | 100.0 | 100.0 |

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A chewing gum comprising a sweetener, a flavoring agent and a chewing gum base comprising water-insoluble, food acceptable substituted, branched polysaccharides wherein:
    a) substituents on the saccharide units in the polysaccharides produce a degree of substitution of at least 1.0; and
    b) the polysaccharides have branches with an average length of 1 to 15 saccharide units per branch; and
    c) wherein the substituents are selected from the group consisting of alkyl, aryl, alkenyl, alkynyl, carbonate ester, ester, peroxy, ether, hemiacetal, hemiketal, acetal, ketal, orthoester, orthocarbonate ester, carboxamide, tertiary amine, imide, azo, sulfide, disulfide, sulfinyl, sulfonyl, carbonothioyl, phosphino, and combinations thereof.

2. A chewing gum comprising a sweetener, a flavoring agent and a chewing gum base comprising water-insoluble, food acceptable substituted polysaccharides wherein the polysaccharides consist essentially of linked saccharide units selected from the group consisting of allose, altrose, mannose, gulose, idose, galactose, 3,6anhydro galactose, sulfated 3,6 anhydro galactose, glucuronic acid, 4-o-methyl-glucuronic acid, esters of galacturonic acid, mannuronic acid, galacturonic acid and esters, aldobiouronic acid, fucose, rhamnose, sulfated galactose, arabinose, xylose, talose, acyl substituted glucose, 2-acetamido-2-deoxyl-glucose, fructose, lactose and their derivatives and combinations thereof, and wherein substituents on the saccharide units in the polysaccharides produce a degree of substitution of at least 1.0 and wherein the substituents are selected from the group consisting of alkyl, aryl, alkenyl, alkynyl, carbonate ester, ester, peroxy, ether, hemiacetal, hemiketal, acetal, ketal, orthoester, orthocarbonate ester, carboxamide, tertiary amine, imide, azo, sulfide, disulfide, sulfinyl, sulfonyl, carbonothioyl, phosphino, and combinations thereof.

3. The chewing gum of claim 2 wherein the substituted polysaccharides comprises galactomannans.

4. The chewing gum of claim 3 wherein the galactomannans have a repeat chain of mannose units with a galactose attached every fourth mannose unit.

5. A chewing gum comprising a sweetener, a flavoring agent and a chewing gum base comprising water-insoluble, food acceptable substituted polysaccharides wherein:
    a) the polysaccharides are selected from the group consisting of alginate, carrageenan, furcellaran, cellulose, guar gum, agar, gum arabic, gum ghatti, gum karaya, gum tragacanth, locust bean gum, pectin, tamarind gum, xanthan gum, arabinoxylan, xyloglucan, tara gum, cereal β-glucan,konjac mannan, curdlan, gellan gum, pullulan, scleroglucan, alternan, elsinan, levan, dextran, chitin, chitosan and combinations thereof; and
    b) substituents on the saccharide units in the polysaccharides produce a degree of substitution of at least 1.0; and
    c) wherein the substituents are selected from the group consisting of alkyl, aryl, alkenyl, alkynyl, carbonate ester, ester, peroxy, ether, hemiacetal, hemiketal, acetal, ketal, orthoester, orthocarbonate ester, carboxamide, tertiary amine, imide, azo, sulfide, disulfide, sulfinyl, sulfonyl, carbonothioyl, phosphino, and combinations thereof.

6. The chewing gum of claim 5 wherein the polysaccharide is selected from the group consisting of gum arabic, guar gum, locust bean gum, cellulose, xanthan gum, curdlan, xyloglucan, pullulan, chitin, chitosan and combinations thereof.

7. The chewing gum of claim 5 wherein the polysaccharide comprises locust bean gum.

8. A chewing gum comprising a sweetener, a flavoring agent and a chewing gum base comprising water-insoluble, food acceptable substituted polysaccharides wherein the polysaccharides consist of saccharide units linked together through glycosidic linkages and wherein the glycosidic linkages in the polysaccharides comprise predominantly glycosidic linkages selected from the group consisting of β-1,4 linkages, β-1,3 linkages, β-1,2 linkages, α-1,2 linkages, β-1,5 linkages, α-1,6 linkages, α-1,3 linkages, α-1,5 linkages, β-1,6 linkages and combinations thereof, and substituents on the saccharide units in the polysaccharides produce a degree of substitution of at least 1.0 and wherein the substituents are selected from the group consisting of alkyl, aryl, alkenyl, alkynyl, carbonate ester, ester, peroxy, ether, hem iacetal, hemiketal, acetal, ketal, orthoester, orthocarbonate ester, carboxamide, tertiary amine, imide, azo, sulfide, disulfide, sulfinyl, sulfonyl, carbonothioyl, phosphino, and combinations thereof.

9. The chewing gum of claim 8 wherein the polysaccharide is produced by enzymatic fermentation.

10. The chewing gum of claim 8 wherein the polysaccharide is produced by microbial fermentation.

11. The chewing gum of claim 8 wherein the substituents are selected from the group consisting fatty acid alkyl esters, fatty acid alkyl ethers and combinations thereof.

12. The chewing gum of claim 8 wherein the substituents are fatty acid alkyl esters having between 6 and 20 carbon atoms.

13. The chewing gum of claim 12 wherein the fatty acid alkyl esters comprise lauroyl chains.

14. The chewing gum of claim 8 wherein the polysaccharides have a degree of substitution of at least 1.5.

15. The chewing gum of claim 8 wherein the polysaccharides have a degree of substitution of at least 1.8.

16. The chewing gum of claim 8 wherein the polysaccharides have a degree of substitution of at least 2.0.

17. The chewing gum of claim 8 wherein the substituted polysaccharides have a weight average molecular weight above 10,000 daltons.

18. The chewing gum of claim 8 wherein the gum base comprises from 5 to 95% substituted polysaccharides by weight of the gum base.

19. The chewing gum of claim 8 wherein the gum base comprises from 1 to 50% by weight of at least one polymer other than the substituted polysaccharides.

20. The chewing gum of claim 19 wherein the at least one polymer other than the substituted polysaccharides comprises a polymer selected from the group consisting of isobutylene-isoprene copolymer (butyl rubber), styrene-butadiene rubber, polyvinyl acetate, polyethylene and combinations thereof.

21. The chewing gum of claim 8 wherein the gum base further comprises from 1 to 20% by weight of emulsifier.

22. The chewing gum of claim 8 wherein the gum base further comprises from 1 to 30% by weight of wax.

23. The chewing gum of claim 8 wherein the gum base further comprises from 1 to 50% by weight of filler.

24. The chewing gum of claim 8 wherein the gum base further comprises from 1 to 40% by weight of a fat.

25. The chewing gum of claim 24 wherein the fat is selected from the group consisting of hydrogenated soybean oil, partially hydrogenated soybean oil, hydrogenated cotton seed oil, partially hydrogenated cotton seed oil, hydrogenated palm oil, partially hydrogenated palm oil, hydrogenated vegetable oil, partially hydrogenated vegetable oil and combinations thereof.

* * * * *